United States Patent
Chang et al.

(10) Patent No.: US 11,876,691 B2
(45) Date of Patent: Jan. 16, 2024

(54) END-TO-END RDMA TELEMETRY SYSTEM

(71) Applicant: Nokia Solutions and Networks Oy, Espoo (FI)

(72) Inventors: Hyunseok Chang, Holmdel, NJ (US); Limin Wang, Plainsboro, NJ (US); Sarit Mukherjee, Morganville, NJ (US); Walid Abdelrahman, Amherst, MA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/586,969

(22) Filed: Jan. 28, 2022

(65) Prior Publication Data
US 2023/0246931 A1    Aug. 3, 2023

(51) Int. Cl.
*H04L 43/06* (2022.01)
*G06F 13/28* (2006.01)
*H04L 43/08* (2022.01)

(52) U.S. Cl.
CPC .............. *H04L 43/06* (2013.01); *G06F 13/28* (2013.01); *H04L 43/08* (2013.01); *G06F 2213/28* (2013.01)

(58) Field of Classification Search
CPC ....... H04L 43/08; G06F 13/28; G06F 2213/28
See application file for complete search history.

(56) References Cited

U.S. PATENT DOCUMENTS 7,133,929 B1 * 11/2006 Shah .................. H04L 49/1515
                                                       710/316
10,536,355 B1 * 1/2020 Cao ...................... G06F 11/302
(Continued)

FOREIGN PATENT DOCUMENTS

EP         3890279 A1     10/2021

OTHER PUBLICATIONS

Beltman, Rutger, et al. "Using P4 and RDMA to collect telemetry data." 2020 IEEE/ACM Innovating the Network for Data-Intensive Science (INDIS). IEEE (Nov. 12, 2020): 1-9.
(Continued)

*Primary Examiner* — Viet D Vu
(74) *Attorney, Agent, or Firm* — Mendelsohn Dunleavy, P.C.; Steve Mendelsohn

(57) ABSTRACT

An end-to-end telemetry system for a Remote Direct Memory Access (RDMA) communication network having multiple end-servers. The system includes an RDMA tracer for each end-server, one or more programmable data planes, and a telemetry collector. Each RDMA tracer extracts host-level telemetry information for one or more RDMA sessions associated with the corresponding end-server. Each programmable data plane extracts network-level telemetry information for one or more RDMA sessions associated with the programmable data plane. The telemetry collector (i) receives the host-level telemetry information from the RDMA tracers and the network-level telemetry information from the one or more programmable data planes and (ii) generates telemetry reports based on the host-level and network-level telemetry information. In some implementations, the system enables real-time monitoring of RDMA traffic at the RDMA protocol level granularity across all RDMA-enabled workloads for different use cases.

23 Claims, 16 Drawing Sheets

(56) References Cited

U.S. PATENT DOCUMENTS

| | | | |
|---|---|---|---|
| 10,931,588 B1 | 2/2021 | Matthews et al. | |
| 11,005,968 B2 | 5/2021 | Kumar et al. | |
| 11,467,873 B2* | 10/2022 | Ganguli | H04L 47/6215 |
| 2003/0229693 A1* | 12/2003 | Mahlik | H04L 41/5025 |
| | | | 709/224 |
| 2017/0155717 A1* | 6/2017 | Tamir | H04L 69/12 |
| 2020/0162337 A1* | 5/2020 | Jain | H04L 41/40 |
| 2020/0177482 A1* | 6/2020 | Singh | H04L 67/1097 |
| 2020/0280518 A1 | 9/2020 | Lee et al. | |
| 2021/0117249 A1 | 4/2021 | Doshi et al. | |
| 2022/0232072 A1* | 7/2022 | Gerlitz | H04L 67/34 |

OTHER PUBLICATIONS

Overview of Azure Monitor agents, www.microsoft.com, 2021 [retrieved on Apr. 26, 2022] Retrieved from the Internet: <URL: https://docs.microsoft.com/en-us/azure/azure-monitor/agents/agents-overview> (13 pages).

RDMA Core Userspace Libraries and Daemons, www.github.com, 2005 [retrieved on Apr. 26, 2022] Retrieved from the Internet: <URL: https://github.com/linux-rdma/rdma-core> (5 pages).

Beggio, Christopher. "Infiniband Monitoring of HPC Clusters using LDMS (Lightweight Distributed Monitoring System)." OpenFabrics Software User Group Workshop (Mar. 2015): 1-20.

Aguilar, Michael, et al. "Host Based InfiniBand Network Fabric Monitoring." 13th Annual OpenFabrics Alliance Workshop (Mar. 2017): 1-31.

Romanovsky, Leon, "RDMAtool and Resource Tracking in RDMA Subsystem." 14th Annual OpenFabrics Alliance Workshop (Apr. 2018): 1-18.

Infiniband Trade Association, "Infiniband Architecture Specification vol. 1—Release 1.2.1" retrieved from URL: <https://www.afs.enea.it/asantoro/V1r1_2_1.Release_12062007.pdf> (Nov. 2007): 1-1727.

Netronome Systems, Inc., "NFP-4000 Theory of Operation." Whitepaper, Document ID WP-NFP-4000-TOO-1/2016, retrieved from URL: <https://www.netronome.com/static/app/img/products/silicon-solutions/WP_NFP4000_TOO.pdf> (2016): 1-8.

ROCE v2.0 UDP Source Port Entropy, www.spinics.net, 2019 [retrieved on Jan. 16, 2022] Retrieved from the Internet: <URL: https://www.spinics.net/lists/linux-rdma/msg73735.html> (3 pages).

* cited by examiner

-PRIOR ART- 200

Algorithm 1: P4 pipeline for RDMA READ packets

/* Stage 1: determine a request's PSN ($PSN_r$) for $p$ */
Input :Packet $p$
Output:Packet $p$ with $PSN_r$ as its metadata
if $p$ is READ request or READ response then
　　process-$PSN_r(p)$;　　　// A stateful action
end

/* Stage 2: update telemetry table */
Input :Packet $p$ with $PSN_r$ as its metadata
Output:Packet $p$
P4 state:
● $T_R$: Table that stores telemetry stats for READ operations.
if $PSN_r > 0$ then
　　$key = hash(GID_{src}, GID_{dst}, UDP\text{-}Port_{src}, PSN_r)$;
　　if $p$ is READ request then
　　　　add an empty telemetry entry with $key$ to $T_R$;
　　else if $p$ is READ response then
　　　　update the entry with $key$ in $T_R$ based on $p$'s content;
　　end
　　remove $PSN_r$ from $p$;
end

Algorithm 2b *find_empty_range_slot*

Input : Starting search index *start*, of *range[]*
Output: first *i*, where *range[i]* is not occupied
*i* := *start*;
while *range[i].occupied* is TRUE do
| *i* := (*i*+1) mod *R*;
end
return *i*

FIG. 5

```
Algorithm 2c process-PSN_r() stateful action
Input   : Packet p
Output  : Packet p with PSN_r as its metadata
Local states:
  • range[] a circular array of length R, which contains PSN
    ranges for outstanding READ requests.
  • pos[] a circular array of length R, which contains a given
    RDMA session's starting position in range[].
  PSN_r = 0;                          // request PSN for p to be determined
  if p is READ request then
    /* Add PSN range information to range[] */
    s ← i = hash(QID_src, QID_dst, UDP-Port_src) mod R;
    if pos[i] is empty then
      | pos[i] = i;
    else
      | i = pos[i];
    end
    while range[i].occupied ← s do
      | i = ((i-1) mod R;    // outstanding requests in the
                                same RDMA session
    end
    if range[i].occupied is empty then
      range[i].PSN_min = PSN_r;
      range[i].PSN_max = PSN_r+⌈l/RDMA_MTU⌉-1;
      range[i].occupied = s;
      PSN_r = PSN_r;
    end
```

FIG. 6

```
else if p is READ response then
    /* Look up request's PSN from range[] */
    s = hash(CID_dst, CID_src, UDP-Port_src) mod R;
    index = pos[s];
    while range[index].occupied -- s do
        if PSN(p) in [range[index].PSN_min,
                      range[index].PSN_max] then
            PSN_r = range[index].PSN_min;
            if PSN(p) -- range[index].PSN_max then
                /* Last response packet, skip this index
                   for future processing */
                range[index].occupied = NULL;
                pos[s] = (index+1) mod R;
            end
            break;
        else
            index = (index+1) mod R;
        end
    end
end
Store PSN_r in p's metadata;
```

FIG. 6 (cont)

Algorithm 3: P4 pipeline for RDMA WRITE packets

/* Stage 1: find the first PSN of a write operation */
Input :Packet $p$
Output:Packet $p$ with $PSN_W$ as its metadata
if $p$ is WRITE then
    | process-$PSN_W(p)$;    // A stateful action
end

/* Stage 2: update telemetry table */
Input :Packet $p$ with $PSN_W$ as its metadata
Output:Packet $p$
P4 state:
- $T_W$: Table that stores telemetry stats for WRITE operations.

if $PSN_W > 0$ then
    $key = hash(CID_{src}, CID_{dst}, QP_{dst}, UDP\text{-}Port_{src}, PSN_W)$;
    if $p$ is WRITE-FIRST then
        | add an empty telemetry entry with $key$ to $T_W$;
    else if $p$ is WRITE-MIDDLE or $p$ is WRITE-LAST then
        | update the entry with $key$ in $T_W$, based on $p$'s
          content;
    end
    remove $PSN_W$ from $p$;
end

FIG. 7

| Algorithm 4: process-PSN$_{rcv}$() stateful action |
|---|
| Input :Packet $p$ |
| Output:Packet $p$ with PSN$_{rcv}$ as its metadata |
| Local states: |
| • $range\{\}$: a circular array of length $R$, which contains PSN ranges for ongoing WRITE operations. |
| • $pos\{\}$: a circular array of length $R$, which contains a given RDMA session's starting position in $range\{\}$ |
| if $p$ is WRITE-FIRST then |
|     /\* add PSN range information to $range\{\}$ \*/ |
|     $s = i = hash(QID_{src}, GID_{dst}, QP_{dst}, UDP\text{-}Port_{src})$ mod $R$; |
|     if $pos\{i\}$ is empty then |
|         $pos\{i\} = i$; |
|     else |
|         $i = pos\{i\}$; |
|     end |
|     while $range\{i\}$.occupied == 1 do |
|         $i = (i+1)$ mod $R$; // ongoing WRITE operations in the same RDMA session |
|     end |
|     if $range\{i\}$.occupied is empty then |
|         $range\{i\}.PSN_{min}$ = PSN; |
|         $range\{i\}.PSN_{max}$ = PSN + $\lceil P/\text{RDMA\_MTU} \rceil$-1; |
|         $range\{i\}$.occupied = $s$; |
|         PSN$_{rcv}$ = PSN; |
|     end |

FIG. 8

```
else if p is WRITE-MIDDLE or p is WRITE-LAST then
    /* Look up the first PSN from range[] */
    s = hash(CID_src, CID_dst, QP_dst, UDP-Port_src) mod R;
    index = pos[s];
    while range[index].occupied == s do
        if PSN(p) in [range[index].PSN_min,
        range[index].PSN_max] then
            PSN_w = range[index].PSN_min;    // found
            if PSN(p) == range[index].PSN_max then
                /* Last write te packet. Skip this index for
                future processing */
                range[index].occupied = NULL;
                pos[s] = (index + 1) mod R;
            end
            break;
        else
            index = (index + 1) mod R;
        end
    end
end
Store PSN_w in p's metadata;
```

FIG. 8 (cont)

Algorithm 5: P4 pipeline for RDMA SEND packets in connection-oriented settings

Input: Packet $p$
Output: Packet $p$
P4 states:

- $T_{PSN}$: Table that stores the first PSN of the currently processed SEND operation in a given RDMA session.
- $T_S$: Table that stores telemetry stats for SEND operations.

if $p$ is SEND-FIRST then
    /* Per-session key for $T_{PSN}$ */
    $key = hash(GID_{src}, GID_{dst}, QP_{dst}, UDP\text{-}Port_{src})$;
    $T_{PSN}.update(key, PSN(p))$;
    /* Per-SEND key for $T_S$ */
    $key_y = hash(GID_{src}, GID_{dst}, QP_{dst}, UDP\text{-}Port_{src}, PSN(p))$;
    add an empty telemetry entry with $key_y$ to $T_S$;
else if $p$ is SEND-MIDDLE or $p$ is SEND-LAST then
    $key = hash(GID_{src}, GID_{dst}, QP_{dst}, UDP\text{-}Port_{src})$;
    $PSN_s = T_{PSN}.lookup(key)$;    // first PSN for SEND
    $key_y = hash(GID_{src}, GID_{dst}, QP_{dst}, UDP\text{-}Port_{src}, PSN_s)$;
    update the entry with $key_y$ in $T_S$ based on $p$'s content;
end

FIG. 9

Algorithm 6: Procedure for filling $QP_{src}$ in RDMA session detection results

Input:
- $\langle GID_{src}, GID_{dst}, QP_{dst}, UDP\text{-}Port_{src} \rangle$: RDMA session detection results
- $\langle GID, QP, PID \rangle$: QP-level tracing results

Output: $\langle GID_{src}, GID_{dst}, QP_{src}, QP_{dst}, UDP\text{-}Port_{src} \rangle$ for each QP in $GID_{src}$ do
    $port = (QP[0..15]\ \text{XOR}\ QP_{dst}[0..15])\ \text{OR}\ 0xC000;$
    if $port == UDP\text{-}Port_{src}$ then
        return $\langle GID_{src}, GID_{dst}, QP, QP_{dst}, UDP\text{-}Port_{src} \rangle;$
    end
end

FIG. 10

*Algorithm 7:* Procedure for choosing a P4 data plane to monitor an RDMA session

Input:
- $<GID_{src}, GID_{dst}, QP_{src}, QP_{dst}, UDP\text{-}Port_{src}>$: a newly detected RDMA session.
- $MAP_s(GID_{src}, GID_{dst})$: Table that stores the set of P4 data planes that can monitor RDMA sessions between them.
- $MAP_t(DP_i)$: Table that stores the number of RDMA sessions handled by P4 data plane $DP_i$.
- $RESULT_s(<GID_{src}, GID_{dst}, QP_{src}, QP_{dst}>)$: Table that indicates the data plane that is responsible for a given RDMA session.

Output: $DP_i$ if $RESULT_s(<GID_{src}, GID_{dst}, QP_{src}, QP_{dst}>)$ is not found then for $DP_i$ in $MAP_s(GID_{src}, GID_{dst})$ do
        | find $DP_i$ with minimum $MAP_t(DP_i)$;
    end
    $RESULT_s(<GID_{src}, GID_{dst}, QP_{src}, QP_{dst}>) = DP_i$;
    $RESULT_s(<GID_{dst}, GID_{src}, QP_{dst}, QP_{src}>) = DP_i$;
    return $DP_i$;

else
    | return $RESULT_s(<GID_{src}, GID_{dst}, QP_{src}, QP_{dst}>)$;
end

FIG. 12

END-TO-END RDMA TELEMETRY SYSTEM

BACKGROUND

Field of the Disclosure

The present disclosure relates to communication networks that support Remote Direct Memory Access (RDMA).

Description of the Related Art

This section introduces aspects that may help facilitate a better understanding of the disclosure. Accordingly, the statements of this section are to be read in this light and are not to be understood as admissions about what is prior art or what is not prior art.

Remote Direct Memory Access (RDMA) is a hardware mechanism by which a local peer can directly access a remote peer's memory without the intervention of the remote peer's CPUs and network stack traversal overhead. The early adoption of RDMA technology was led by the high-performance computing (HPC) community to interconnect HPC clusters on specialized high-throughput and low-latency InfiniBand (IB) networks with RDMA capability. Since then RDMA-based transport has been more widely adopted in data centers, especially since the demanding throughput/latency requirements of cloud-scale services such as search, storage, big data analytics, deep learning, etc., can no longer be adequately met by the traditional TCP/IP-based networking. New protocol standards such as RoCE (RDMA over Converged Ethernet) or iWARP (Internet Wide-Area RDMA Protocol) allow IB transport packets to be encapsulated (e.g., with Ethernet for RoCEv1, User Datagram Protocol (UDP) for RoCEv2, or Transmission Control Protocol (TCP) for iWARP), and carried over the commodity Ethernet fabric, facilitating the adoption of RDMA on existing data center networks.

SUMMARY

Although more and more data center applications have started to embrace RDMA-based transport, the monitoring infrastructure for RDMA-enabled workloads in modern data centers falls short of RDMA's growing popularity. In particular, there are several unique challenges in RDMA traffic monitoring.

Monitoring granularity. Traditional network traffic monitoring systems are designed for standard TCP/IP-based networking, and these monitoring facilities typically operate at flow-level granularity, where flows are defined by network endpoint properties (e.g., Media Access Control/Internet Protocol (MAC/IP) addresses and TCP/UDP transport ports). Existing network telemetry interfaces (e.g., NetFlow, sFlow, etc.) and existing hardware support for network telemetry (e.g., Mellanox ASAP2) are designed around flow-level traffic aggregation. However, traditional network flows are a poor abstraction for RDMA traffic, since the wire protocol for RDMA operations (e.g., memory read/write, message send/receive) between two peers is completely different from that for byte-stream exchange between two network endpoints at the transport layer. In RDMA, communicating peers are addressed by their queue pair (QP) IDs and Global IDentifiers (GID) configured with RDMA network adaptors. An RDMA packet carries its destination QP in a Base Transport Header (BTH) field, but source QP information is included only for datagram operations in an Extended Transport Header (ETH) field. With UDP encapsulation in RoCEv2, even the BTH/ETH fields remain opaque inside the UDP payload. As a result, transport-layer flow monitoring does not provide any meaningful telemetry for RDMA-enabled workloads.

End-to-end visibility. With traditional TCP/IP applications, it is relatively easy to achieve end-to-end visibility on their network activities (e.g., which applications are communicating with each other, and how) from flow-level network telemetry. The telemetry itself contains network endpoints, and network-endpoint information of applications is readily available outside the applications. On the other hand, achieving the same level of end-to-end visibility in RDMA-enabled applications is not as straightforward for several reasons. First, RDMA QP operations (e.g., QP creation/termination) by applications are hidden behind IB device drivers, and real-time visibility on QP creation/termination events does not exist. Second, one-sided RDMA communication completely hides RDMA operations from application processes. That is, when a local application A accesses a remote application B's memory, application B and its underlying operating system remain oblivious to application A's read/write activities because RDMA processing is completely offloaded to the network adaptor associated with application B. Application B does not have any visibility on which memory region and how often that memory region is being accessed by application A. This means that traditional accounting and auditability at application B are unavailable for one-sided RDMA memory access. Achieving end-to-end visibility is important not just for tenants who want to understand network-level activities of their applications, but also for data center operators for network management and planning purposes.

Monitoring at scale. Real-time (i.e., line-rate) monitoring of RDMA traffic at the RDMA protocol level across all RDMA-enabled workloads is important for several reasons. For example, if any network congestion is detected in RDMA telemetry, then data center operators can quickly react by migrating some of the affected RDMA-enabled workloads, thereby mitigating the congestion. QP-level telemetry (i.e., OP creation/termination by applications) can help the operators monitor the use or misuse of shared QP resources by tenants. RDMA transaction-level (aka verb-level) telemetry can be valuable feedback for optimizing application performance and detecting performance anomalies associated with RDMA communication. Despite these benefits, performing fine-grained RDMA telemetry at scale across the entire data center is a significant challenge. Monitoring RDMA traffic at the RDMA protocol level requires inspecting per-packet payload beyond Ethernet/IP/UDP headers, as well as maintaining telemetry states across packets. Such stateful, deep-packet inspection requires significant compute resources when done purely in software.

Problems in the prior art are addressed in accordance with the principles of the present disclosure by an end-to-end RDMA telemetry system that enables real-time monitoring of RDMA traffic at both the network level and the host level. In some implementations, the system includes (i) distributed programmable data planes that extract network-level information from encapsulated RDMA traffic and (ii) local RDMA tracers that identify host-level RDMA operations and activities. The system also includes a telemetry collector that receives and processes the network-level and host-level information from the programmable data planes and local tracers to generate reports for different use cases.

In one embodiment, the present disclosure is an end-to-end telemetry system for a Remote Direct Memory Access (RDMA) communication network having multiple end-servers. The system includes an RDMA tracer for each end-server, one or more programmable data planes, and a telemetry collector. Each RDMA tracer extracts host-level telemetry information for one or more RDMA sessions created by applications running on the corresponding end-server. Each programmable data plane extracts network-level telemetry information for one or more RDMA sessions associated with the programmable data plane. The telemetry collector (i) receives the host-level telemetry information from the RDMA tracers and the network-level telemetry information from the one or more programmable data planes and (ii) generates telemetry reports based on the host-level and network-level telemetry information. In some implementations, the system enables real-time monitoring of RDMA traffic at the RDMA protocol granularity across all RDMA-enabled workloads for different use cases.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 shows Algorithm 1, which presents pseudocode for the processing performed by a programmable data plane of FIG. 1 for RDMA READ packets;

FIGS. 4 and 5 show Algorithms 2a and 2b, respectively, which presents pseudocode for the processing performed by a programmable data plane of FIG. 1 for one possible implementation of the process-$PSN_r$ function of Algorithm 1;

FIG. 6 shows Algorithm 2c, which presents pseudocode for the processing performed by a programmable data plane of FIG. 1 for another possible implementation of the process-$PSN_r$ function of Algorithm 1;

FIG. 7 shows Algorithm 3, which presents pseudocode for the processing performed by a programmable data plane of FIG. 1 for RDMA WRITE packets;

FIG. 8 shows Algorithm 4, which presents pseudocode for the processing performed by a programmable data plane of FIG. 1 for the process-$PSN_w$ function of Algorithm 3;

FIG. 9 shows Algorithm 5, which presents pseudocode for the processing performed by a programmable data plane of FIG. 1 for RDMA SEND packets in connection-oriented settings;

FIG. 10 shows Algorithm 6, which presents pseudocode for the processing performed by the telemetry collector of FIG. 1 to determine $QP_{src}$ in RDMA session detection results;

FIG. 12 shows Algorithm 7, which presents pseudocode for the processing performed by the telemetry collector of FIG. 1 to choose a RDMA programmable data plane to monitor an RDMA session.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
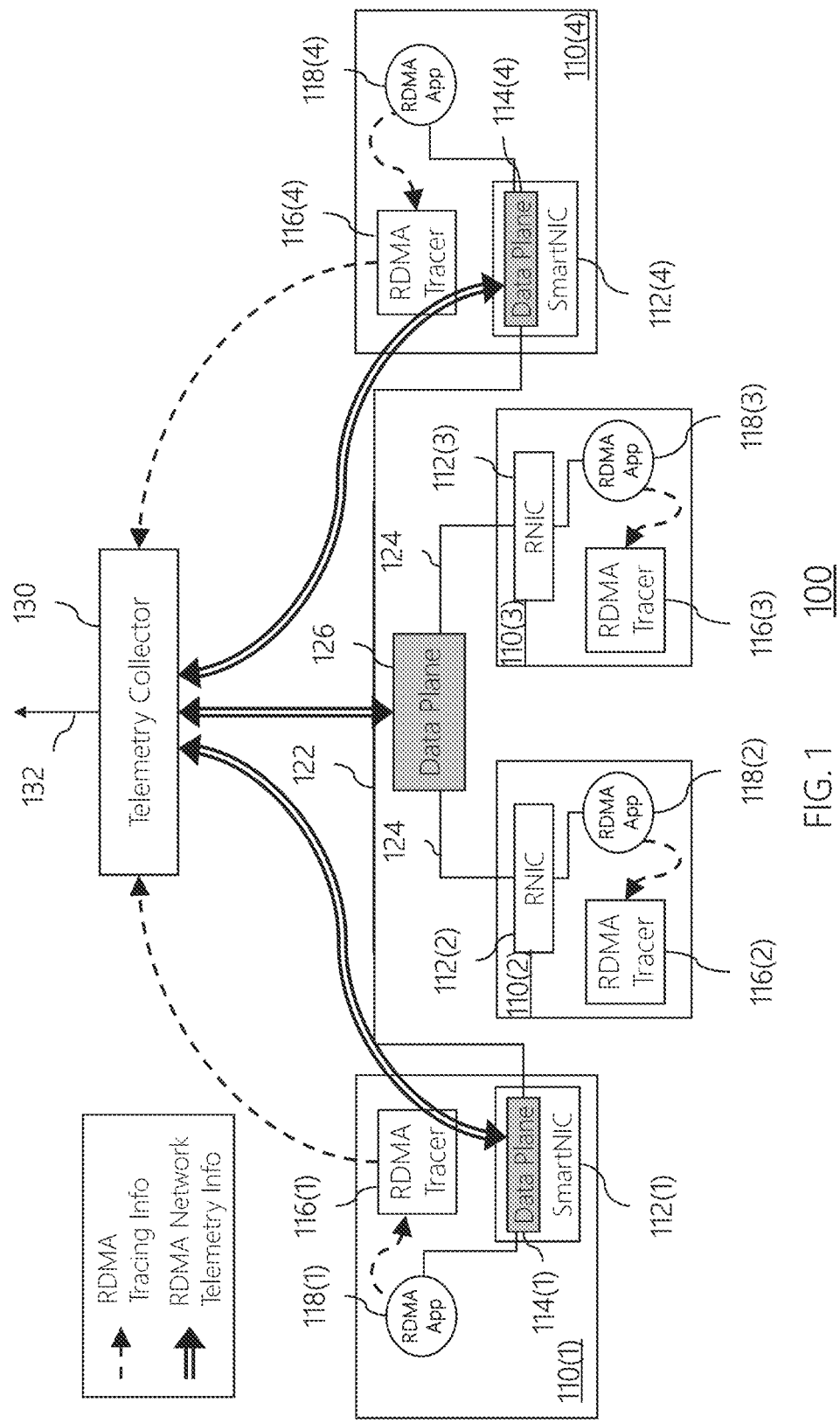
FIG. 1 is a block diagram of a portion of a communication network according to certain embodiments of the present disclosure.

FIG. 1 is a block diagram of a portion of a communication network 100 according to certain embodiments of the present disclosure. As shown in FIG. 1, communication network 100 has four peers (aka endpoints, end-servers, hosts) 110(1)-110(4) that can communication with one another using an RDMA protocol. In the particular situation depicted in FIG. 1, peer 110(1) is configured to communicate with peer 110(4) via path 122, and peer 110(2) is configured to communicate with peer 110(3) via path 124. It will be understood that, in general, communication network 100 may have many more peers and that each peer may be configured to communicate with any other peer via a corresponding path.

As depicted in FIG. 1, there are two different types of peers: those peers, such as peers 110(1) and 110(4), having so-called Smart Network Interface Cards (SmartNICs), which can handle RDMA offload as well as being equipped with a programmable data plane, and those peers, such as peers 110(2) and 110(3), having conventional RDMA-capable Network Interface Cards (RNICs) without a programmable data plane.

Referring first to peer 110(1), peer 110(1) includes SmartNIC 112(1) with internal programmable data plane 114(1), RDMA tracer 116(1), and RDMA application (app) 118(1). Likewise, peer 110(4) includes SmartNIC 112(4) with internal programmable data plane 114(4), RDMA tracer 116(4), and RDMA app 118(4).

On the other hand, peer 110(2) includes a conventional RNIC 112(2), RDMA tracer 116(2), and RDMA app 118(2), while peer 110(3) includes a conventional RNIC 112(3), RDMA tracer 116(3), and RDMA app 118(3). Because peers 110(2) and 110(3) do not have internal programmable data planes, the path 124 for their communications includes an external programmable data plane 126, which may be implemented, for example, in a network switch or other suitable node of the routing infrastructure of communication network 100.

Although each peer 110(i) is depicted in FIG. 1 as having a single RDMA app 118(i), in general, each peer 110(i) may independently implement one or more different RDMA apps 118(i).

Note that, in the particular situation depicted in FIG. 1, two peers having SmartNICs (i.e., peers 110(1) and 110(4)) are configured to communicate, and two peers with conventional RNICs (i.e., peer 110(2) and 110(3)) are configured to communicate. In general, any two peers can be configured to communicate. For example, if peers 110(1) and 110(2) were configured to communicate, then, depending on the particular implementation, the path for that communication might or might not include an external programmable data plane such as or analogous to processor 126. In some implementations, the network processing responsible for defining paths between peers in communication network 100 (*i*) knows which peers have SmartNICs with programmable data planes and which peers have conventional RNICs without programmable data planes and (ii) uses that information to determine whether to include a node having an external programmable data plane in the path between two specific peers.

As shown in FIG. 1 and as described further below, communication network 100 also includes telemetry collector 130, which receives (i) network-level telemetry information from the programmable data planes 114(1), 114(4), and 126 and (ii) host-level telemetry information from the RDMA tracers 116(1)-116(4). Telemetry collector 130 is capable of processing that network-level and host-level information to generate reports 132 regarding the RDMA communications in communication network 100. Note that, telemetry collector 130 also receives and processes network-level and host-level telemetry information from all of the other programmable data planes and RDMA tracers in communication network 100 that are not depicted in FIG. 1.

As used herein, the term "network-level information" refers to the information on RDMA packets that is collected by programmable data planes from inside the network, and the term "host-level information" refers to the information on application activities related to RDMA (e.g., QP creation/destruction, RDMA verbs issued) that is collected by RDMA tracers from within end hosts. "RDMA protocol-level" telemetry (or "RDMA telemetry" for short) means that telemetry can interpret the RDMA protocol from network traffic, and as such it is the most general, umbrella term. RDMA protocol-level telemetry can then be further broken down to multiple levels, that is. QP-level telemetry (e.g., QP creation/termination by apps), session-level telemetry (e.g., session duration, per-session byte count, bandwidth usage, loss rate, etc), and RDMA transaction (verb)-level telemetry (e.g., RDMA transaction type, request/response size, per-transaction bandwidth usage, etc.).

In some implementations, the distributed programmable data planes 114/126 and RDMA tracers 116 and the centralized telemetry collector 130 form an end-to-end RDMA telemetry system within communication network 100 that (i) enables real-time monitoring of RDMA traffic at the RDMA protocol-level and (ii) achieves end-to-end visibility on RDMA traffic by identifying RDMA application workloads associated with the RDMA traffic.

In some implementations, peers 110(1)-110(4) are bare-metal servers equipped with an RDMA-capable SmartNIC or a conventional RNIC, and the RDMA apps 118(1)-118(4) are deployed (i) directly on top of bare-metal servers, (ii) inside containers running on bare-metal servers, (iii) inside virtual machines created by a hypervisor on bare-metal servers, or (iv) inside containers running on virtual machines created by a hypervisor on bar-metal servers. A bare-metal server is a physical computer server that can be used by one or more consumers or tenants. A given bare-metal server can be rented out to and shared by one or more tenants in various forms. For example, a bare-metal server can be managed by container orchestration software (e.g., Kubernetes) to run containers created by tenants directly on top of the bare metal server's operating system. A bare-metal server can be managed by cloud orchestration software (e.g., OpenStack) to run virtual machines instantiated by tenants with a hypervisor. A given virtual machine created by a tenant can in turn host one or more containers created with the help of container orchestration software run by the same tenant. In other implementations, some or all of the peers may be cloud servers or other suitable types of end-servers different from bare-metal servers.

Some of the peers (e.g., peers 110(1) and 110(4)) are equipped with SmartNICs 112 which provide RDMA offload as well as a programmable data plane 114. The on-board programmable data plane can process RDMA data-plane traffic on the way out of or into the peer. Other peers (e.g., peers 110(2) and 110(3)) have conventional RNICs 112 without an internal programmable data plane.

Each RDMA tracer 116 is an end-server component deployed on an individual peer's operating system. Each RDMA tracer 116 monitors (i) the RDMA QPs that are created and destroyed and (ii) the RDMA verbs that issued by its RDMA-enabled apps 118 and sends this monitored information to the telemetry collector 130.

Each programmable data plane 114 detects RDMA-session creation/termination events from RDMA traffic and sends RDMA session-level information to the telemetry collector 130. In addition, each programmable data plane 114 performs various stateful telemetry operations on RDMA packets and sends aggregated telemetry information to the telemetry collector 130. As used herein, the term "stateful telemetry operation" means that the operation creates, stores, and updates telemetry state information in the programmable data plane's memory as part of processing a stream of RDMA packets one by one. Stateful means packets belonging to certain monitoring units have dependencies, for example, order matters. Stateful telemetry operations imply that those RDMA-correlated packets cannot be processed individually or independently of other packets.

The telemetry collector 130 builds real-time telemetry streams for RDMA traffic by combining data feeds coming from the distributed RDMA tracers 116 and programmable data planes 114/126. The resulting telemetry streams can show detailed RDMA protocol-level activities of deployed application workloads. As used herein, the term "real-time telemetry" on RDMA traffic means that telemetry information is collected and analyzed concurrently for currently active RDMA traffic, as opposed to offline processing of captured RDMA traffic traces.

Depending on the implementation, the end-to-end RDMA telemetry system within communication network 100 provides one or more of the following benefits:

End-to-end visibility on RDMA traffic from its source application all the way to its sink/destination application. This improved visibility can help with accounting and auditing for (one-sided) RDMA traffic in multi-tenant data centers;

Enables data center operators to locate responsible application workloads and migrate them to mitigate problems in real time, when there is network congestion or contention due to RDMA traffic;

End-to-end visibility on RDMA traffic, in a fully transparent fashion, without having to modify RDMA-enabled applications;

Fine-grained RDMA telemetry at the RDMA protocol-level (e.g., RDMA transaction type, RDMA message size, per-transaction bandwidth usage, loss rate, QP-level statistics). This fine-grained information can help with debugging/optimizing RDMA communication of applications as well as monitoring use or misuse of shared QP resources by data center tenants; and Fine-grained RDMA telemetry at scale and without introducing prohibitively high compute resource usage by leveraging programmable data-plane hardware.

RDMA Tracers

In some implementations, an RDMA tracer 116 is a software component deployed on end-servers where one or more RDMA-enabled apps 118 are running. An RDMA tracer monitors QP-level activities of each RDMA app (e.g., QP creation and termination) to enable identification of which QPs belong to what application processes. Whenever QP-level events are detected for an RDMA session, the local RDMA tracer collects and sends <GID, QP, PID> tuples to the telemetry collector 130, where the 128-bit GID (Global Identifier) uniquely identifies the physical port on the network adaptor of the local end-server for the RDMA session, the 24-bit QP (Queue Pair) identifier represents the local end-server, and the 32-bit PID (Process Identifier) identifies the local RDMA app that is associated with RDMA session.

According to one possible implementation, an RDMA tracer 116 intercepts the QP operations issued by a local RDMA app 118 by instrumenting the user-space RDMA APIs used by the app. In the current RDMA ecosystem, libibverbs is a de-facto standard user-space library providing lowest-level RDMA verb interfaces, upon which various types of higher-level RDMA APIs (e.g., MPI, rsocket, Winsock) are built. Thus, libibverbs can be modified (e.g., by overriding the APIs for creating and destroying QPs) to monitor an app's peer-level QP activities.

According to one possible implementation, an RDMA tracer 116 leverages eBPF-based in-kernel tracing. In the eBPF-based approach, user-defined eBPF tracers can be attached via kprobes to the kernel APIs that are responsible for QP creation and termination in IB kernel drivers. The eBPF tracers then report to user-space the QPs that are created and destroyed from the kernel. This approach does not require any modification to the RDMA apps or any RDMA library to be used.

Programmable Data Planes

A programmable data plane 114/126 detects RDMA session creation/termination events by analyzing RDMA data-plane/control-plane packets and performs various stateful RDMA telemetry operations on RDMA data-plane packets.

RDMA Session Detection

In the RDMA protocol, a <GID, QP> tuple represents a globally unique endpoint of an RDMA communication. Thus, <$GID_{src}$, $QP_{src}$, $GID_{dst}$, $QP_{dst}$> tuple information uniquely identifies a particular RDMA session between two peers: a source (src) peer and a destination (dst) peer, where:

$GID_{src}$ is the GID for the source peer;
$QP_{src}$ is the QP identifier for the source peer;
$GID_{dst}$ is the GID for the destination peer; and
$QP_{dst}$ is the QP identifier for the destination peer.

In the RoCEv2 protocol, however, a data-plane packet does not carry complete information to identify its session in RDMA headers.

RDMA communication between two peers is two-way. As described in the previous paragraph, a source or a destination is represented by <GID, QP>. Since RDMA communication is two-way, source and destination interchange depending on the direction of the communication flow. For example, in the case of an RDMA READ operation, peer X sends a READ request packet to peer Y, where peer X is the source and peer Y is the destination. In return, peer Y sends one or more READ response packets to peer X, where peer Y is the source and peer X is the destination. In the case of an RDMA WRITE operation in reliable connection setting, peer X sends one or more WRITE packets to peer Y, where peer X is the source and peer Y is the destination. In return, peer Y sends one or more ACKNOWLEDGE packets to peer X, where peer Y is the source and peer X is the destination.

Figure 2:
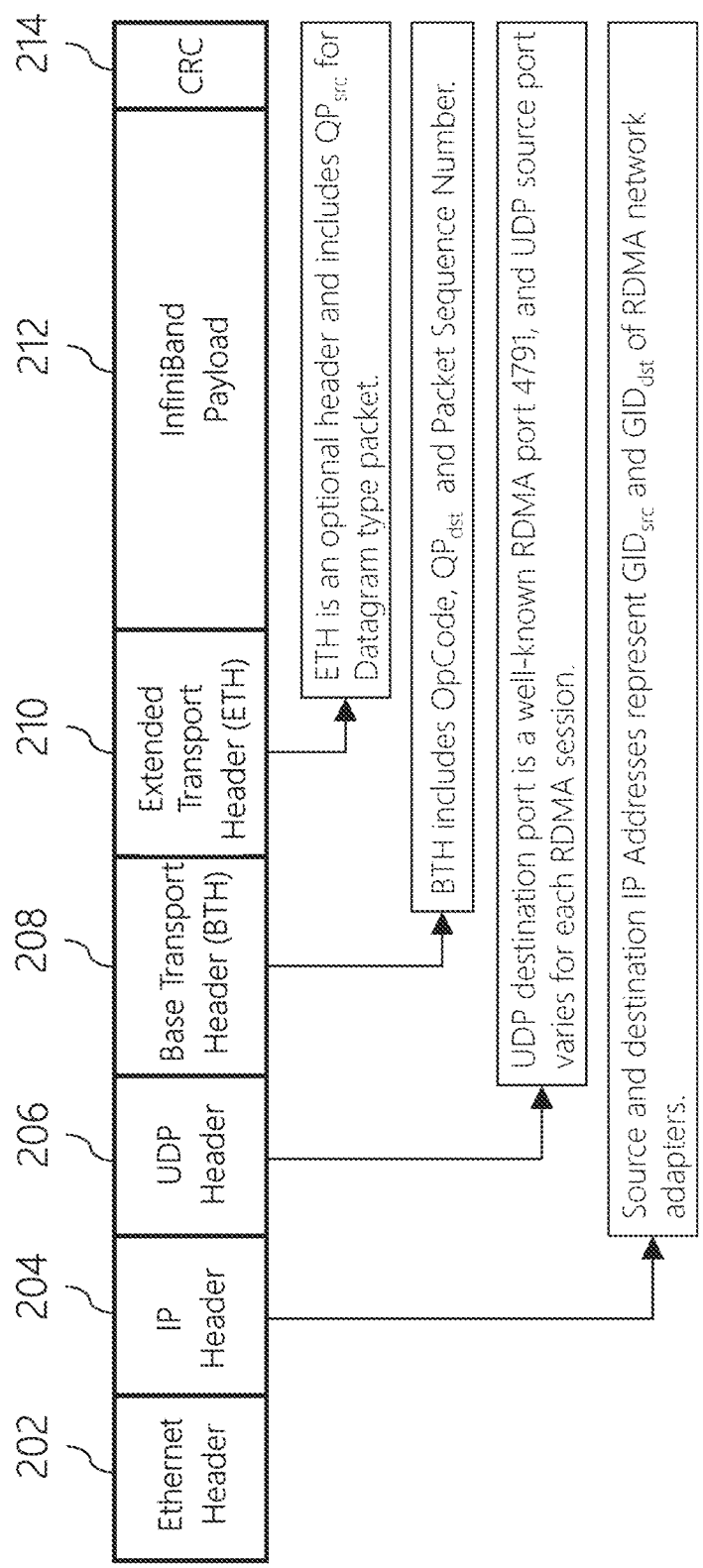
FIG. 2 shows the format of a conventional, encapsulated RDMA packet according to the RoCEv2 protocol.

FIG. 2 shows the format of a conventional, encapsulated RDMA packet 200 according to the RoCEv2 protocol. As shown in FIG. 2, each RoCEv2 packet has an Ethernet header 202, followed by an IP header 204, followed by a UDP header 206, followed by a base transport header (BTH) field 208, followed by an (optional) extended transport header (ETH) field 210, followed by the InfiniBand payload 212, and terminated by a cyclic redundancy check (CRC) field 214, where:

The source and destination IP addresses in the IP header 204 represent $GID_{src}$ and $GID_{dst}$ of the RDMA network adaptors;

In the UDP header 206, the UDP destination port is the standardized RDMA port 4791 used by all existing conventional RNICs to encapsulate RDMA packets based on Internet Assigned Numbers Authority (IANA) guidance, and the UDP source port varies for each RDMA session;

The BTH field 208 includes the OpCode, $QP_{dst}$, and the RDMA packet sequence number (PSN), where OpCode is the operation code, such as READ, WRITE, SEND, RECEIVE, etc.; and If the optional ETH field 210 appears in the packet, then it includes $QP_{src}$ for unreliable, datagram-type RDMA packets.

Thus, as shown in FIG. 2, $GID_{src}$ and $GID_{dst}$ are carried in the IP header 204, and $QP_{dst}$ is found in the BTH field 208, but $QP_{src}$ is carried only by unreliable datagram-type packets in the separate ETH field 210, such that $QP_{src}$ is absent in other types of packets (e.g., reliable/unreliable connection types). For reliable RDMA packets, there is a guarantee that the packets are delivered at most once, in order, and without corruption. For unreliable RDMA packets, there is no guarantee that the packets will be delivered or about the order of the packets. The term "connected" implies that there is a single, designated recipient, while the term "datagram" implies that any peer may be a recipient. The incomplete session information in the RDMA headers of non-datagram-type encapsulated RDMA packets (i.e., the BTH field only) is problematic for end-to-end RDMA telemetry. In this case, $QP_{src}$ can be indirectly discovered by using the UDP source port in the outer UDP header 206. In the RoCEv2 protocol, an RDMA session between two peers carries the same UDP source port in both directions, and this port varies across different RDMA sessions. Thus, in order to restore complete RDMA session information at the telemetry collector 130, a programmable data plane 114/126 not only detects RDMA sessions (if possible), but also collects and sends UDP source port information to the telemetry collector 130 to enable the telemetry collector 130 to determine $QP_{src}$ if necessary.

RDMA session detection by a programmable data plane 114/126 takes into consideration how RDMA data communication is initiated. In RDMA, data communication between two peers is preceded by a connection negotiation step, where the two peers exchange information needed to establish the communication. There are two ways to perform RDMA connection negotiation: one with an RDMA Connection Manager (RDMA-CM) and the other using a TCP/IP-based out-of-band channel. RDMA session detection should support both cases.

The RDMA-CM technique is an RDMA protocol-compliant approach to negotiate a connection between two peers. When a connection is established with the help of RDMA-CM, two peers exchange ConnectRequest, ConnectReply, and ReadyToUse packets, through which both $QP_{src}$ and $QP_{dst}$ can be found. Since these packets are also RoCEv2 packets, they are encapsulated by IP/UDP headers. Thus, upon seeing these packets, a programmable data plane 114/126 extracts a <$GID_{src}$, $GID_{dst}$, $QP_{src}$, $QP_{dst}$, UDP-$Port_{src}$> tuple from the packets and sends the tuple to the telemetry collector 130, where UDP-$Port_{src}$ is the UDP port number of the source peer. As explained further below, the telemetry collector uses the tuple information to associate telemetry information collected by the programmable data plane with corresponding RDMA sessions. Conversely, when the programmable data plane sees DisconnectRequest and DisconnectReply packets, which are generated during connection termination, the programmable data plane instructs the telemetry collector to remove a corresponding <$GID_{src}$, $GID_{dst}$, $QP_{src}$, $QP_{dst}$, UDP-$Port_{src}$> tuple from its local memory.

If two peers rely on an out-of-band channel (e.g., via TCP socket) to negotiate an RDMA connection, then it is up to each RDMA app 118 to design the channel. Thus, such custom-designed communication channels cannot be intercepted and interpreted by a programmable data plane 114/126. To detect RDMA sessions in this scenario, the programmable data plane maintains <$GID_{src}$, $GID_{dst}$, $QP_{dst}$, UDP-$Port_{src}$> tuples in its stateful memory. Whenever the programmable data plane detects a new <$GID_{src}$, $GID_{dst}$, $QP_{dst}$, UDP-$Port_{src}$> tuple, this is considered as a new RDMA session, and the programmable data plane sends the <$GID_{src}$, $GID_{dst}$, $QP_{dst}$, UDP-$Port_{src}$> tuple to the telemetry collector 130. As described further below, the missing $QP_{src}$ in this case will be determined by the telemetry collector 130 with the help of an RDMA tracer 116. Each tuple entry in the programmable data plane has a timer associated with it, and thus the tuple entry can be removed from the local memory (as well as from the telemetry collector) if no data-plane traffic is observed for a prolonged period (e.g., greater than a specified threshold duration).

RDMA Data-Plane Telemetry

In some implementations, telemetry from the programmable data planes 114/126 enables real-time monitoring of RDMA traffic at the RDMA protocol-level. The RDMA protocol supports multiple types of operations (called "verbs") that are represented by RDMA OpCode. Commonly used verbs are one-sided READ/WRITE and two-sided SEND/RECEIVE operations. Depending on verbs, they can be used with or without reliable guarantee, and with or without connection-oriented service. These operations can support large messages (up to 2 GB), and thus each operation may generate multiple maximum transmission unit (MTU)-sized packets on the wire. This means that, in order to support verb-level telemetry, the programmable data plane needs to maintain verb-level states across packets.

In some implementations, due to the limited stateful memory, the programmable data plane cannot store arbitrarily large states locally. At the same time, although possible, it is not desirable for the programmable data plane to export local states to the telemetry collector too often, in order to avoid overloading the collector. As a trade-off, the programmable data plane divides up available stateful memory to store K different types of verb-level states, each with its own fixed-size space budget, where K is the number of RDMA operation types that are supported (e.g., K=4 if the telemetry supports RDMA READ/WRITE/SEND/RECEIVE operations). Whenever the size of a specific type of state grows close to its limit, the programmable data plane exports the accumulated states to the telemetry collector via the processor's control-plane interface.

READ Operation

The READ operation involves a READ request packet sent by a requester, followed by one or more (MTU-sized) READ response packets sent by a responder, which contain returned memory content. The READ request packet carries the packet sequence number (PSN) N in the BTH field 208, and the memory content length L in the ETH field 210. In the resulting READ response packets, the PSN of the first response packet exactly matches that of the request packet (i.e., N). Any additional response packets carry PSNs that increment one by one (N+1, N+2, etc.). The total number R of response packets is equal to ceiling (L/MTU).

In order to maintain verb-level states for READ operations (e.g., transferred READ memory size, packet count for each READ, etc.), the programmable data plane needs to be able to associate individual response packets with their corresponding request packet. The first response packet can easily be paired up with a corresponding request packet based on the same PSN they carry. However, the second and subsequent response packets do not carry any unique signature in their headers that can trace them back to an original request packet, especially when there are multiple outstanding requests within a given RDMA session. To address this problem, the programmable data plane leverages the fact that, upon seeing a request packet, the programmable data plane can predict the range of PSNs in corresponding response packets. That is, if the programmable data plane sees a PSN N in a request packet, then the response packets will carry N, N+1, . . . . N+R−1 in their PSN fields, respectively. This property holds even when there are multiple outstanding requests. Exploiting this behavior, the programmable data plane for READ packets can proceed in two stages as described in Algorithm 1 of FIG. 3.

In the first stage of Algorithm 1, the programmable data plane marks incoming READ (request/response) packets at verb-level granularity. That is, when the programmable data plane sees a READ request packet, the programmable data plane remembers the packet's PSN. When a set of response packets are coming in, the programmable data plane marks them with the PSN of a corresponding request packet. This stateful processing is performed by the process-$PSN_r$ action of Algorithm 1, which can be realized with a custom extern function supported by the programmable data plane's hardware backend. One possible implementation of the process-$PSN_r$ action is described in Algorithm 2a and 2b of FIGS. 4 and 5.

Figure 4:
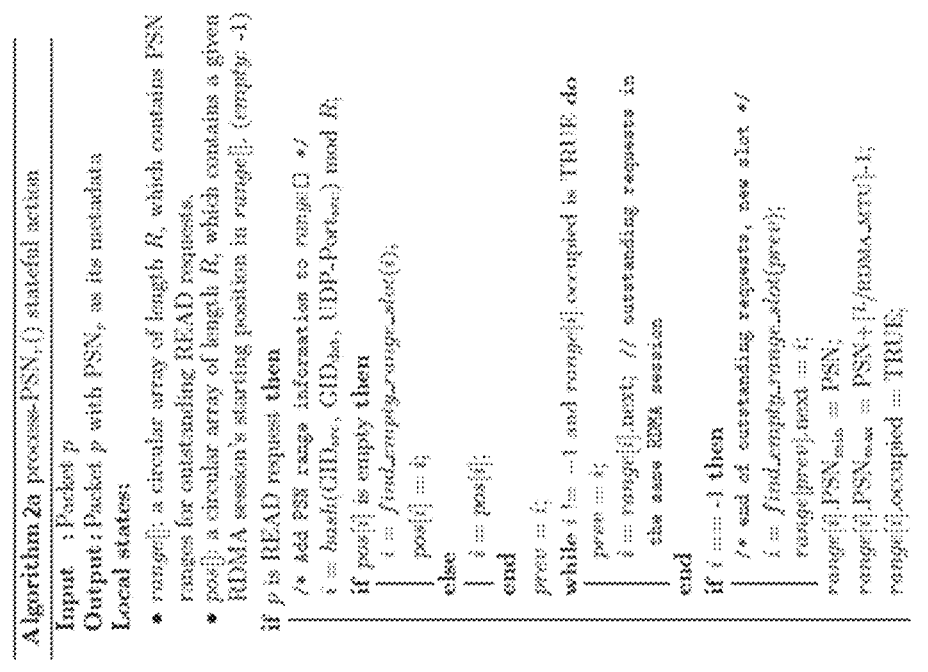
Figure 4:
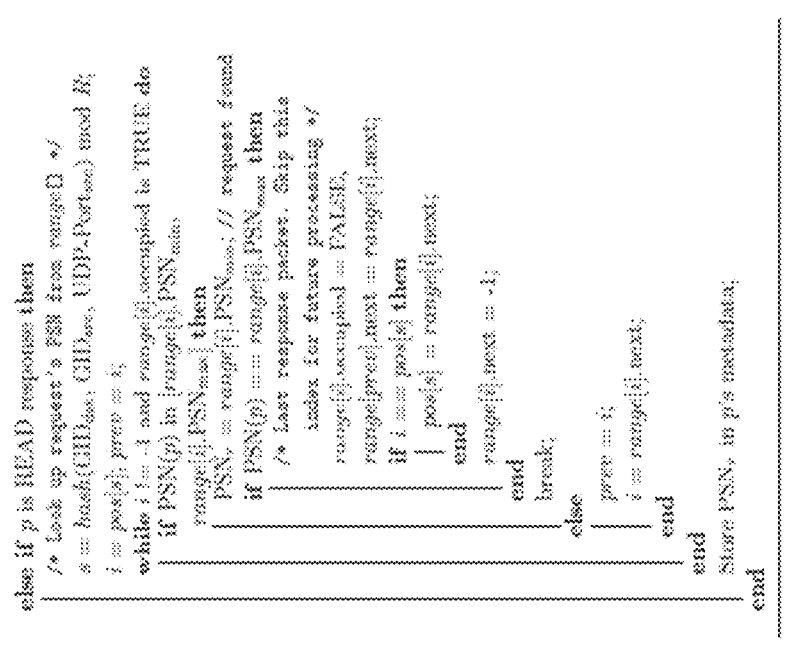

Algorithm 2a of FIG. 4 stores the PSNs of outstanding READ requests in a circular array range[ ]. When READ requests are coming from multiple RDMA sessions, their PSNs are stored at hashed locations in range[ ] that vary across different RDMA sessions. To avoid storing PSNs from different RDMA sessions at overlapping locations overwriting each other, range[ ] maintains the "next" field to skip ahead PSNs that are already stored for other RDMA sessions, where next is a pointer to link chain-related entries together. For example, if range[2] is being used for a given session and another range is needed for that session and range[3] and range[4] are already used being by other sessions, but range[5] is available, then range[2].next is set equal to 5.

For efficient processing on a massively-threaded (e.g., 480 threads) pipeline processor architecture, the local states maintained in the process-$PSN_r$ action are stored in a thread-local memory region of the programmable data plane, so that the thread that processes particular RDMA session traffic does not require coordination with other threads to access the states. Even then, the amount of memory read/write accesses in Algorithms 2a and 2b can come with non-negligible slow-down in processing throughput of the programmable data plane due to the limited amount of internal/local memory and the relatively high access latency for external memory in modern the programmable data plane hardware.

Another (performance-optimized) implementation of the process-PSN$_r$ action of Algorithm 1 is described in Algorithm 2c of FIG. 6, which attempts to reduce the amount of memory read/write at the cost of not counting all RDMA requests. Algorithm 2c does away with the memory-access overhead for skipping-ahead stored PSNs using range[ ].next. Instead, Algorithm 2c checks if a given PSN of a new request can be safely stored without overwriting an existing stored PSN of any other RDMA session. If Algorithm 2c cannot find such location in range[ ], Algorithm 2c simply ignores this request in telemetry analysis. One caveat is that, if the response of the ignored request happens to be hashed into the same hash value of any other existing request X stored in range[ ], then the response will be wrongly associated with request X, thereby overcounting request X's telemetry. Algorithm 2c sacrifices accuracy of telemetry for common-case performance.

Whether the process-PSN$_r$ action of Algorithm 1 is implemented using Algorithms 2a and 2b or Algorithm 2c, at the end of the first stage of Algorithm 1, a request packet's PSN is stored as metadata in each response packet. Utilizing this metadata information, the second stage of Algorithm 1 builds and updates READ-level states using table $T_R$.

WRITE Operation

When the WRITE operation is issued by a peer, the peer generates one or more (MTU-sized) WRITE packets which contain memory content to write. If the operation is used in a reliable connection setting, then the stream of WRITE packets are interleaved by one or more ACKNOWLEDGE packets sent by a responder in a reverse direction. Every WRITE packet carries a PSN in the BTH field 208, which increments one by one. The first WRITE packet contains memory content length L in the ETH field 210. This means that, upon seeing the first WRITE packet (with WRITE-FIRST OpCode in the BTH field 208), the programmable data plane can predict how many more WRITE packets will be generated by the WRITE operation. In other words, if the programmable data plane sees a PSN N in the first WRITE packet, then the programmable data plane can consider those WRITE packets whose PSNs are in the range of [N, N+R−1] as belonging to the same WRITE operation. Therefore, as shown in Algorithm 3 of FIG. 7, the programmable data plane processing for WRITE packets can proceed very similar to how the programmable data plane handles READ response packets in a stateful fashion. Similar to process-PSN$_r$ action for READ operation (Algorithms 2a and 2c), the process-PSN$_w$ action for WRITE operation can be implemented for either completeness or performance. Algorithm 4 of FIG. 8 is a performance-optimized implementation, similar to Algorithm 2c.

SEND Operation

The SEND operation is similar to the WRITE operation in terms of data-plane packets when invoked in connection-oriented settings. That is, the SEND operation triggers one or more SEND packets with optional ACKNOWLEDGE packets sent back in response. However, unlike the first WRITE packet, the first SEND packet does not carry message-length information. In this case, a set of SEND packets that belong to a particular SEND operation are sent back-to-back without being interleaved with other SEND packets triggered by different SEND operations. Therefore, in order to group together all SEND packets that are triggered by the same SEND operation, the programmable data plane maintains an additional state table that stores the first PSN of the currently processed SEND operation within a given RDMA session (see Algorithm 5 of FIG. 9).

The SEND operation can also be used in unreliable datagram service settings. In that case, the message size is limited to MTU, and therefore there is no need to maintain states in the DMA pipeline processor's data plane.

Telemetry Collector

The telemetry collector 130 of FIG. 1 combines (i) host-level RDMA tracing results (e.g., QP-level activities of applications) from the RDMA tracers 116, (ii) RDMA session detection results from the programmable data planes 114/126, and (iii) network-level telemetry information from the programmable data planes 114/126 to build end-to-end telemetry at the RDMA protocol-level.

The QP-level tracing results are in the form of <GID, QP, PID>, while the RDMA session detection results are either <GID$_{src}$, GID$_{dst}$, QP$_{src}$, QP$_{dst}$, UDP-Port$_{src}$> (when RDMA-CM is used for connection setup) or <GID$_{src}$, GID$_{dst}$, QP$_{dst}$, UDP-Port$_{src}$> (when out-of-band channels are used for connection negotiation). When RDMA-CM is used, it is straightforward to combine the end-to-end QP-level tracing results and the end-to-end RDMA session detection results to obtain <GID$_{src}$, GID$_{dst}$, QP$_{src}$, QP$_{dst}$, UDP-Port$_{src}$, PID$_{src}$, PID$_{dst}$> tuples. These tuples carry complete end-to-end RDMA session information. On the other hand, RDMA session detection results for non-RDMA-CM cases do not contain QP$_{src}$ information. To discover QP$_{src}$, the fact that UDP-Port$_{src}$ is computed based on QP$_{src}$ and QP$_d$t when RDMA-CM is not used is leveraged. That is:

$$\text{UDP-Port}_{src} = (QP_{src}[0 \ldots 15] \text{ XOR } QP_{dst}[0 \ldots 15])$$
$$\text{OR } 0xC000$$

where the equation uses the 16 least-significant bits (LSBs) of the 24-bit QP identifiers. Based on this relationship, the procedure shown in Algorithm 6 of FIG. 10 can provide the missing QP$_{src}$ information in <GID$_{src}$, GID$_{dst}$, QP$_{dst}$, UDP-Port$_{src}$> tuples.

The final step to obtain end-to-end RDMA telemetry at the RDMA protocol-level is to combine the above RDMA session information with network-level RDMA telemetry feeds from the distributed programmable data planes 114/126. The telemetry collector 130 can utilize the existing programmable data plane control-plane interface (e.g., notifications or Packet-In via P4 runtime/gRPC) to receive telemetry feeds from the programmable data planes. The overall telemetry collector operations can be implemented with existing stream processing frameworks (e.g., Apache Spark, Apache Storm).

Figure 11:
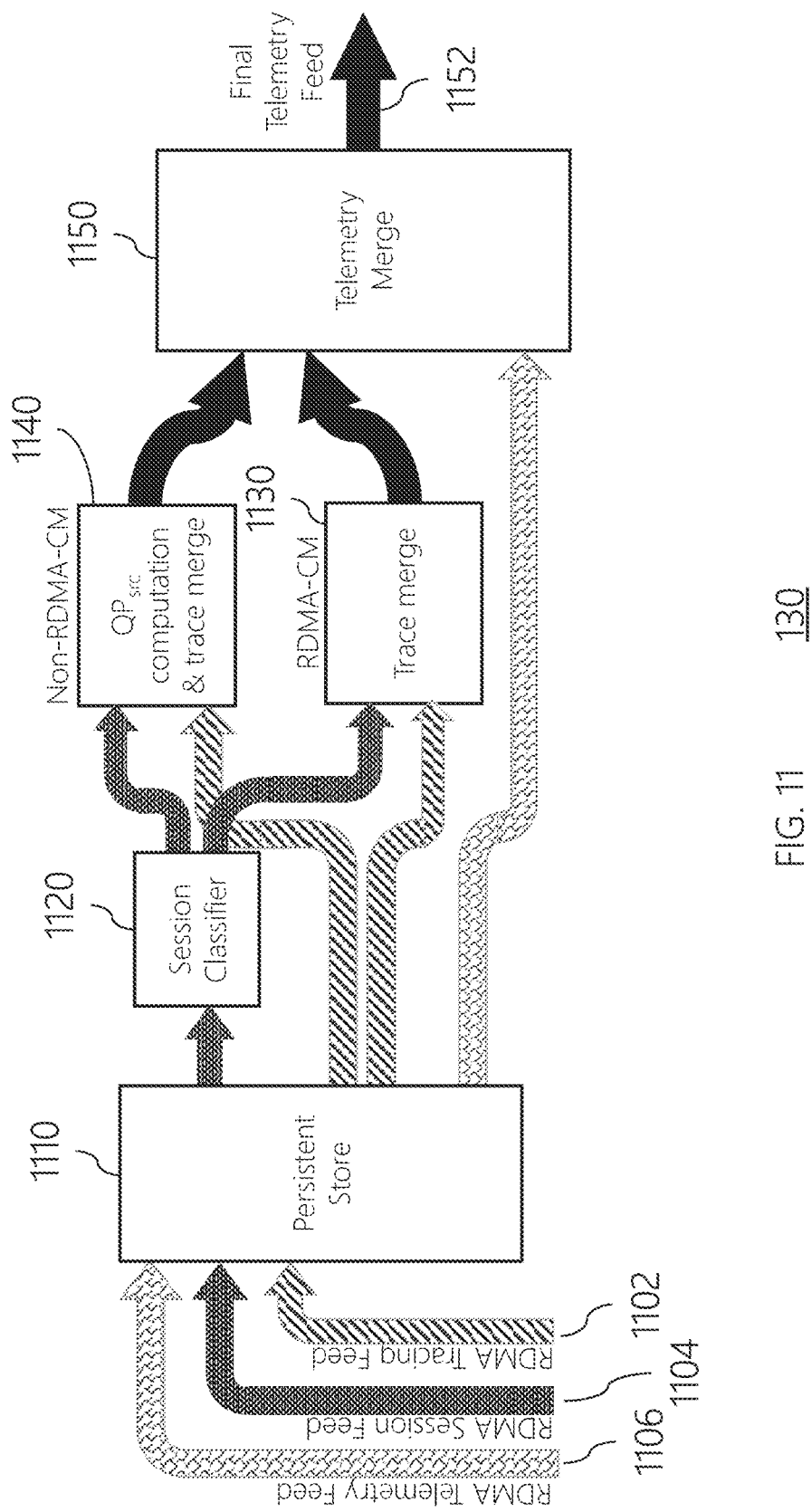
FIG. 11 shows a stream processing pipeline that can support the processing at the telemetry collector of FIG. 1.

FIG. 11 shows a stream processing pipeline that can support the aforementioned processing at the telemetry collector 130. Data feeds 1102-1106 from the RDMA tracers 116 and the programmable data planes 114/126 are stored into a persistent store 1110 before being injected into the stream processing pipeline. A session classifier 1120 directs the RDMA session detection feed into one of two processing nodes 1130 and 1140, depending on whether or not RDMA-CM is used. Processing node 1130 handles packets that are transmitted using an RDMA-CM, while processing node 1140 handles packets that are transmitted using something other than an RDMA-CM, such as a TCP/IP-based out-ofband channel. The outputs from these nodes 1130 and 1140 are fed into the telemetry merge step 1150, where the final telemetry feed 1152 is generated.

Non-Redundant Telemetry

One drawback of RDMA telemetry presented earlier is that the technique can introduce duplicate telemetry when a given RDMA session is observed by more than one programmable data plane 114/126. For example, the RDMA sessions between peers 110(1) and 110(4) in FIG. 1 will be monitored by both programmable data plane 114(1) of peer 110(1) and programmable data plane 114(4) of peer 110(4), thereby wasting their data-plane resources. In addition, the hardware used to implement the programmable data planes 114 in SmartNICs may have different processing and memory capacity from the hardware used to implement the external programmable data planes 126. In order to prevent any duplicate telemetry and make the best use of available programmable data plane resources, the distributed programmable data planes need to coordinate with one another to decide which programmable data plane is responsible for a particular RDMA session. A responsible programmable data plane will then inspect both directions of a given RDMA session. Such coordination can be achieved by the telemetry collector 130 which has a centralized view on currently active RDMA sessions. In order to support data-plane coordination, the telemetry collector and the programmable data planes can be extended as follows.

The extended telemetry collector 130 maintains a data structure called $MAP_s$ that stores the set of programmable data planes that can monitor RDMA sessions between peers $GID_{src}$ and $GID_{dst}$. $MAP_s$ can be built by observing unique programmable data planes that report the creation of RDMA sessions between peers $GID_{src}$ and $GID_{dst}$. Once populated, the content of $MAP_s$ will remain mostly unchanged (barring server provisioning or reconfiguration) since the programmable data planes are located at the edge of the data center network (e.g., at end servers or at the top of server racks). The extended telemetry collector also maintains a data structure called $MAP_t$ that stores the count of RDMA sessions that are actively monitored by each programmable data plane and a data structure called $RESULT_s$ that indicates which programmable data plane is responsible for a given RDMA session. The content $MAP_t$ is updated every time a new or dead session is reported.

Algorithm 7 of FIG. 12 shows one possible implementation of making a decision on where to enable telemetry for a given RDMA session based on $MAP_s$ and $MAP_t$. Basically, if there is more than one programmable data plane that can monitor RDMA sessions between peers $GID_{src}$ and $GID_{dst}$, then Algorithm 7 tries to evenly distribute telemetry load among the available programmable data planes. Alternatively, if the goal of the decision is to choose a programmable data plane that has not exceeded its maximum capacity limit (in terms of the number of assigned RDMA sessions), then the for-loop in Algorithm 7 can be changed to look for such programmable data plane DP.

In order to conform to the telemetry decision made by the extended telemetry collector 130, the extended programmable data plane re-uses the RDMA session tuples <$GID_{src}$, $GID_{dst}$, $QP_{dst}$, $UDP\text{-}Port_{src}$> that it maintains internally. The telemetry collector marks the tuple entry (either ON or OFF) in each programmable data plane based on its decision. The programmable data plane then performs telemetry operations only for those tuple entries marked ON.

Figure 13:
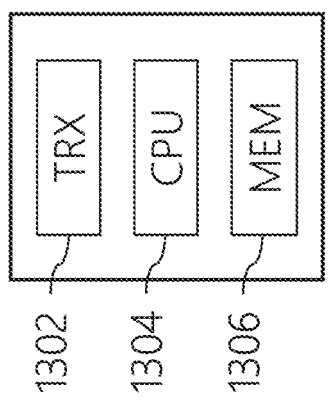
FIG. 13 is a simplified hardware block diagram of a component that can be used to implement any of the nodes of the communication network shown in FIG. 1.

FIG. 13 is a simplified hardware block diagram of a component 1300 that can be used to implement any of the individual nodes of communication network 100 shown in FIG. 1. In particular, instances of component 1300 can be used to implement each of peers 110(1) and 110(4) having a SmartNIC 112(1) or 112(4), each of peers 110(2) and 110(3) having a conventional RNIC 112(2) or 112(3), the switch or other component having programmable data plane 126, and each component implementing at least part of the telemetry collector 130. As shown in FIG. 13, the component 1300 includes (i) communication hardware (e.g., wireless, wireline, and/or optical transceivers (TRX)) 1302 that supports communications with other components, (ii) a processor (e.g., CPU microprocessor) 1304 that controls the operations of the component 1300, and (iii) a memory 1306 that stores code executed by the processor 1304 and/or data generated and/or received by the component 1300.

In some implementations of the end-to-end RDMA telemetry system of FIG. 1:

Each RDMA tracer 116 is implemented as a software module installed on individual end-servers;

Each programmable data plane 114/126 is implemented in a programmable element, such as a field-programmable gate array (FPGA) or a programmable application-specific integrated circuit (ASIC), that is part of either a SmartNIC and/or a programmable network switch; and The telemetry collector 130 is implemented as a pool of one or more servers or virtualized compute instances that are organized in a centralized or distributed fashion.

In particular, each RDMA tracer 116 is a privileged software module that is installed on individual peers to monitor host applications. The RDMA tracer module can be realized with a shared library or part of device driver. In multi-tenant data centers, tenant applications are commonly deployed within tenant-owned virtual machines (VMs) created on bare-metal servers for isolation and security. In that case, an RDMA tracer will be installed within the guest operating system of tenant VMs, with explicit tenant approval.

An RDMA tracer 116 may be deployed as a privileged software component in a guest operating system of tenant VMs for tenant management purposes in commercial virtualization software (e.g., Guest Agent in VMware vRealize Automation, VM Agent in Azure Virtual Machine). In such case, a corresponding product guide will describe the functionality of such an add-on software component. If an RDMA tracer is installed directly on top of a bare-metal server by a data center operator, then a similar installation guide is needed to explain to the operator the functionality of the RDMA tracer.

The programmable data planes 114/126 perform in-network monitoring of RDMA traffic by inspecting RDMA packets in a stateful fashion. In some implementations, deployment of this functionality involves target network elements having flexible programmability built-in, as well as extra onboard memory (beyond the memory for packet buffering). Possible network elements are SmartNICs with programmable CPU cores (e.g., the BlueField data processing unit from NVIDIA of Santa Clara, California) or FPGAs (e.g., the C5000X FPGA from Intel Corporation of Santa Clara, California), or network switches with programmable ASICs (e.g., the Tofino programmable ASIC of Intel Corporation) or FPGA capability (e.g., the Arista 7130 FPGA-enabled network switch from Arista Networks of Santa Clara, California). The data center network fabric is configured such that RDMA traffic is routed or mirrored into these programmable network elements.

The telemetry collector 130 produces real-time end-to-end RDMA telemetry feeds by combining telemetry streams from host RDMA tracing by the RDMA tracers 116 and in-network RDMA traffic monitoring by the programmable data planes 114/126. The end-to-end RDMA telemetry feeds can contain at least the following types of RDMA events:

RDMA session S between process $P_1$ on host $H_1$ and process $P_2$ on host $H_2$ is created at time $T_i$;

RDMA session S between process $P_1$ on host $H_1$ and process $P_2$ on host $H_2$ is destroyed at time $T_j$;

RDMA operation $V_1$ is invoked by process $P_1$ on host $H_1$ to send/receive B bytes of data during RDMA session S at time $T_k$;

RDMA operation $V_2$ is invoked by process $P_1$ on host $H_1$ to read/write B bytes of data at memory address M of process $P_2$ on host $H_2$ during RDMA session S at time $T_l$; and RDMA session S between process $P_1$ on host $H_1$ and process $P_2$ on server $H_2$ experiences packet loss rate of R.

These types of end-to-end RDMA telemetry feeds can be consumed by different entities for different use cases. Some use-case examples are the following:

Telemetry use case #1: Data center tenants access feeds directly to conduct performance diagnostics for their deployed RDMA applications or to audit read/write access by the applications. In this use case, the user manual of the telemetry system will clarify what information the feeds contain and how to access the feeds.

Telemetry use case #2: A network congestion management module can listen to the feeds. When the management module detects a cluster of packet losses in RDMA sessions that are associated with a specific server, a rack, or a network switch, the management module can instruct associated application workloads to be relocated to another server or rack to mitigate the losses. Such capability (i.e., traffic-aware dynamic application migration) can be promoted as a product feature.

Telemetry use case #3: A security monitoring module can listen to the feeds and compare telemetry streams from end-server RDMA tracing and those from in-network RDMA traffic monitoring in real time. Discrepancy or mismatch between the two streams can be caused by bogus RDMA traffic generated by a malicious actor (e.g., in case of network spoofing attack). Therefore, when the security monitoring module detects any discrepancy, the module can alert an affected tenant and/or trace the server that bogus RDMA traffic originates from to block it. Such security attack detection/mitigation capability can be highlighted as a product feature.

In certain embodiments, the present disclosure is an end-to-end telemetry system for a Remote Direct Memory Access (RDMA) communication network comprising multiple end-servers. The system comprises an RDMA tracer for each end-server, wherein each RDMA tracer is configured to extract host-level telemetry information for one or more RDMA sessions associated with the end-server; one or more programmable data planes, each programmable data plane configured to extract network-level telemetry information for one or more RDMA sessions associated with the programmable data plane; and a telemetry collector configured to (i) receive the host-level telemetry information from the RDMA tracers and the network-level telemetry information from the one or more programmable data planes and (ii) generate telemetry reports based on the host-level and network-level telemetry information.

In at least some of the above embodiments, each end-server comprises an RDMA-capable network interface card (RNIC) comprising an RDMA tracer.

In at least some of the above embodiments, at least one RNIC comprises an internal programmable data plane.

In at least some of the above embodiments, at least one RNIC does not have an internal programmable data plane.

In at least some of the above embodiments, at least one programmable data plane is external to the end-servers.

In certain embodiments, the present disclosure is a machine-implemented method for an RDMA tracer of an end-to-end RDMA telemetry system for an RDMA network comprising multiple end-servers, the method comprising the RDMA tracer (i) extracting host-level telemetry information for one or more RDMA sessions associated with an end-server of the RDMA network and (ii) providing the host-level telemetry information to a telemetry collector of the system.

In at least some of the above embodiments, when the RDMA tracer detects a queue pair (QP)-level event for an RDMA session of the one or more RDMA sessions, the host-level telemetry information comprises a global identifier (GID) that identifies a physical port on a network adaptor of a local end-server of the RDMA session; a QP identifier that identifies the local end-server, and a process identifier (PID) that identifies an RDMA application at the local end-server and associated with the RDMA session.

In certain embodiments, the present disclosure is a machine-implemented method for a programmable data plane of an end-to-end RDMA telemetry system for an RDMA network comprising multiple end-servers. The method comprises the programmable data plane extracting network-level telemetry information for one or more RDMA sessions associated with an end-server of the RDMA network and providing the network-level telemetry information to a telemetry collector of the system.

In at least some of the above embodiments, for an RDMA session of the one or more RDMA sessions, the RDMA session involving a source end-server and a destination end-server of the RDMA network, the programmable data plane extracts from one or more encapsulated RDMA packets a GID for the source end-server; a GID for the destination end-server; a QP identifier for the destination end-server; and a UDP port number for the source end-server.

In at least some of the above embodiments, the programmable data plane extracts the GIDs for the source and destination end-servers from an IP header in an encapsulated RDMA packet; the QP identifier for the destination end-server from a base transport header in the encapsulated RDMA packet; and the UDP port number for the source end-server from a UDP header in the encapsulated RDMA packet.

In at least some of the above embodiments, the RDMA session is established using an RDMA connection manager and the programmable data plane further extracts from the one or more encapsulated RDMA packets a QP identifier for the source end-server.

In at least some of the above embodiments, the programmable data plane extracts the GIDs for the source and destination end-servers from an IP header in an encapsulated RDMA packet; the QP identifier for the destination end-server from a base transport header in the encapsulated RDMA packet; the QP identifier for the source end-server from an extended transport header in the encapsulated RDMA packet; and the UDP port number for the source end-server from a UDP header in the encapsulated RDMA packet.

In at least some of the above embodiments, the RDMA session is established using a TCP/IP-based out-of-band channel and a QP identifier for the source end-server is absent from the one or more encapsulated RDMA packets.

In at least some of the above embodiments, for an RDMA session of the one or more RDMA sessions, the programmable data plane extracts RDMA session detection results and network-level telemetry information.

In at least some of the above embodiments, the programmable data plane extracts the RDMA transaction-level telemetry for one or more of a one-sided RDMA READ operation, a one-sided RDMA WRITE operation, a two-sided RDMA SEND operation, and a two-sided RDMA RECEIVE operation.

In at least some of the above embodiments, the programmable data plane maintains dedicated stateful memory for each different type of RDMA operation and when the dedicated stateful memory for a particular type of RDMA operation reaches a threshold fullness level, the programmable data plane exports corresponding accumulated states to the telemetry collector and reclaims the memory.

In at least some of the above embodiments, the network-level telemetry information comprises telemetry information collected inside the RDMA network.

In certain embodiments, the present disclosure is a machine-implemented method for a telemetry collector of an end-to-end RDMA telemetry system for an RDMA network comprising multiple end-servers. The method comprises the telemetry collector receiving host-level telemetry information for one or more RDMA sessions associated with an end-server, receiving network-level telemetry information for the one or more RDMA sessions; and processing the host-level and network-level telemetry information to generate external telemetry reports.

In at least some of the above embodiments, for an RDMA session of the one or more RDMA sessions, the RDMA session involving a source end-server and a destination end-server, the telemetry collector builds end-to-end telemetry at an RDMA protocol level by combining (i) host-level tracing results, (ii) RDMA session detection results, and (iii) network-level telemetry information.

In at least some of the above embodiments, the telemetry collector receives the host-level tracing results from at least one RDMA tracer and the RDMA session detection results and network-level telemetry information from at least one programmable data plane.

In at least some of the above embodiments, for an RDMA session of the one or more RDMA sessions, the RDMA session involving a source end-server and a destination end-server, the telemetry collector receives from a programmable data plane associated with the RDMA session: a GID for the source end-server; a GID for the destination end-server, a QP identifier for the destination end-server; and a UDP port number for the source end-server.

In at least some of the above embodiments, the RDMA session is established using an RDMA connection manager and the telemetry collector further receives, from the programmable data plane, a QP identifier for the source end-server.

In at least some of the above embodiments, the RDMA session is established using a TCP/IP-based out-of-band channel; the telemetry collector does not receive, from the programmable data plane, a QP identifier for the source end-server; and the telemetry collector derives the QP identifier for the source end-server from other received telemetry data.

In at least some of the above embodiments, the telemetry collector derives the QP identifier for the source end-server from the QP identifier for the destination end-server and the UDP port number for the source end-server.

In at least some of the above embodiments, the telemetry collector derives the QP identifier for the source end-server from the equation:

$$\text{UDP-Port}_{src} = (QP_{src}[0 \ldots 15] \text{ XOR } QP_{dst}[0 \ldots 15]) \text{ OR } 0xC000,$$

wherein:
  $\text{UDP-Port}_{src}$ is the UDP port number for the source end-server;
  $QP_{src}[0 \ldots 15]$ is a 16-bit QP identifier for the source end-server; and
  $QP_{dst}[0 \ldots 15]$ is a 16-bit QP identifier for the destination end-server.

In at least some of the above embodiments, when a path for an RDMA session of the one or more RDMA sessions comprises more than one programmable data plane, the telemetry collector selects one of the programmable data planes to provide telemetry information to the telemetry collector.

In at least some of the above embodiments, the telemetry collector (i) maintains a first data structure that stores a set of programmable data planes that can monitor RDMA sessions between pairs of end-servers of the RDMA network; a second data structure that stores a count of RDMA sessions that are actively monitored by each programmable data plane; and a third data structure that indicates which programmable data plane is responsible for each active RDMA session of the one or more RDMA sessions and (ii) uses the first, second, and third data structures to select one of the programmable data planes to provide telemetry information to the telemetry collector for an RDMA session of the one or more RDMA sessions.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A distributed end-to-end telemetry system for a distributed Remote Direct Memory Access (RDMA) communication network comprising multiple, distributed end-servers, the system comprising multiple, distributed hardware components configured to implement:
an RDMA tracer deployed as a software component on an operating system of a processor inside each different end-server, wherein each RDMA tracer is configured to transparently extract host-level telemetry information on RDMA-related application activities for one or more RDMA sessions associated with the end-server without having to modify any RDMA-enabled applications running on the processor;
one or more programmable data planes implemented on devices different from the processors that implement the RDMA tracers, each programmable data plane configured to extract and maintain RDMA-specific network-level telemetry state information from encapsulated RDMA packets for one or more RDMA sessions associated with one or more end-servers, wherein each different programmable data plane may be either (i) inside an end-server or (ii) outside of all of the end-servers; and
a centralized telemetry collector configured to (i) receive the transparently extracted host-level telemetry information from the multiple, distributed RDMA tracers and the RDMA-specific network-level telemetry state information from the one or more programmable data planes and (ii) generate telemetry reports based on the transparently extracted host-level and RDMA-specific network-level telemetry state information, wherein, for an RDMA session of the one or more RDMA sessions, the RDMA session involving a source end-server and a destination end-server, the telemetry collector builds end-to-end telemetry at an RDMA protocol level by combining (i) host-level tracing results, (ii) RDMA session detection results, and (iii) network-level telemetry information.

2. The system of claim 1, wherein each end-server comprises an RDMA-capable network interface card (RNIC) and an RDMA tracer.

3. The system of claim 2, wherein at least one RNIC comprises an internal programmable data plane.

4. The system of claim 2, wherein at least one RNIC does not have an internal programmable data plane.

5. The system of claim 1, wherein at least one programmable data plane is external to the end-servers.

6. A machine-implemented method for a programmable data plane of a distributed end-to-end RDMA telemetry system for a distributed RDMA network comprising multiple, distributed end-servers, wherein (i) the system comprises multiple, distributed RDMA tracers, one or more programmable data planes, and a centralized telemetry collector and (ii) the programmable data plane is either inside an end-server of the network or outside of all of the end-servers of the RDMA network, the method comprising the programmable data plane:
extracting and maintaining RDMA-specific network-level telemetry state information from encapsulated RDMA packets for one or more RDMA sessions associated with one or more associated end-servers of the RDMA network; and
providing the RDMA-specific network-level telemetry state information to the centralized telemetry collector of the system, wherein:
the programmable data plane is implemented on a device different from processors that implement any RDMA-enabled applications;
the programmable data plane maintains dedicated stateful memory for each different type of RDMA operation; and
when the dedicated stateful memory for a particular type of RDMA operation reaches a threshold fullness level, the programmable data plane exports corresponding accumulated states to the telemetry collector and reclaims the memory.

7. The method of claim 6, wherein, for an RDMA session of the one or more RDMA sessions, the RDMA session involving a source end-server and a destination end-server of the RDMA network, the programmable data plane extracts from one or more encapsulated RDMA packets:
a GID for the source end-server;
a GID for the destination end-server;
a QP identifier for the destination end-server; and
a UDP port number for the source end-server.

8. The method of claim 7, wherein the programmable data plane extracts:
the GIDs for the source and destination end-servers from an IP header in an encapsulated RDMA packet;
the QP identifier for the destination end-server from a base transport header in the encapsulated RDMA packet; and
the UDP port number for the source end-server from a UDP header in the encapsulated RDMA packet.

9. The method of claim 7, wherein:
the RDMA session is established using an RDMA connection manager; and
the programmable data plane further extracts from the one or more encapsulated RDMA packets a QP identifier for the source end-server.

10. The method of claim 9, wherein the programmable data plane extracts:
the GIDs for the source and destination end-servers from an IP header in an encapsulated RDMA packet;
the QP identifier for the destination end-server from a base transport header in the encapsulated RDMA packet;
the QP identifier for the source end-server from an extended transport header in the encapsulated RDMA packet; and
the UDP port number for the source end-server from a UDP header in the encapsulated RDMA packet.

11. The method of claim 7, wherein:
the RDMA session is established using a TCP/IP-based out-of-band channel; and
a QP identifier for the source end-server is absent from the one or more encapsulated RDMA packets.

12. The method of claim 7, wherein, for an RDMA session of the one or more RDMA sessions, the programmable data plane extracts RDMA session detection results and RDMA-specific network-level telemetry state information.

13. The method of claim 12, wherein the programmable data plane extracts RDMA transaction-level telemetry for one or more of a one-sided RDMA READ operation, a one-sided RDMA WRITE operation, a two-sided RDMA SEND operation, and a two-sided RDMA RECEIVE operation.

14. The method of claim 12, wherein the RDMA-specific network-level telemetry state information comprises telemetry information collected inside the RDMA network.

15. A machine-implemented method for a centralized telemetry collector of a distributed, end-to-end RDMA telemetry system for a distributed RDMA network comprising multiple, distributed end-servers, the method comprising the centralized telemetry collector:
   receiving, from multiple, distributed RDMA tracers of the system, each distributed RDMA tracer inside a different, distributed end-server, transparently extracted host-level telemetry information on RDMA-related application activities for one or more RDMA sessions associated with the multiple, distributed end-servers;
   receiving, from one or more programmable data planes, RDMA-specific network-level telemetry state information extracted from encapsulated RDMA packets for the one or more RDMA sessions associated with the multiple, distributed end-servers, wherein each different programmable data plane is either inside an end-server of the network or outside of all of the end-servers of the RDMA network; and
   processing the transparently extracted host-level telemetry information and the RDMA-specific network-level telemetry state information to generate external telemetry reports, wherein, for an RDMA session of the one or more RDMA sessions, the RDMA session involving a source end-server and a destination end-server, the telemetry collector builds end-to-end telemetry at an RDMA protocol level by combining (i) host-level tracing results, (ii) RDMA session detection results, and (iii) network-level telemetry information.

16. The method of claim 15, wherein the telemetry collector receives:
   the host-level tracing results from at least one RDMA tracer; and
   the RDMA session detection results and network-level telemetry information from at least one programmable data plane.

17. The method of claim 15, wherein, for the RDMA session involving the source end-server and the destination end-server, the telemetry collector receives from a programmable data plane associated with the RDMA session:
   a GID for the source end-server;
   a GID for the destination end-server;
   a QP identifier for the destination end-server; and
   a UDP port number for the source end-server.

18. The method of claim 17, wherein:
   the RDMA session is established using an RDMA connection manager; and
   the telemetry collector further receives, from the source end-server, a QP identifier for the source end-server.

19. The method of claim 17, wherein:
   the RDMA session is established using a TCP/IP-based out-of-band channel;
   the telemetry collector does not receive, from the programmable data plane, a QP identifier for the source end-server; and
   the telemetry collector derives the QP identifier for the source end-server from other received telemetry data.

20. The method of claim 19, wherein the telemetry collector derives the QP identifier for the source end-server from the QP identifier for the destination end-server and the UDP port number for the source end-server.

21. The method of claim 20, wherein the telemetry collector derives the QP identifier for the source end-server from the equation:

$$\text{UDP-Port}_{src} = (\text{QPsrc}[0\ldots15] \text{ XOR } \text{QPdst}[0\ldots15]) \text{ OR } 0xC000,$$

wherein:
   $\text{UDP-Port}_{src}$ the UDP port number for the source end-server;
   $\text{QP}_{src}[0\ldots15]$ is a 16-bit QP identifier for the source end-server; and
   $\text{QP}_{dst}[0\ldots15]$ is a 16-bit QP identifier for the destination end-server.

22. The method of claim 15, wherein, when a path for an RDMA session of the one or more RDMA sessions comprises more than one programmable data plane, the telemetry collector selects one of the programmable data planes to provide telemetry information to the telemetry collector.

23. The method of claim 22, wherein:
   the telemetry collector maintains:
      a first data structure that stores a set of programmable data planes that can monitor RDMA sessions between pairs of end-servers of the RDMA network;
      a second data structure that stores a count of RDMA sessions that are actively monitored by each programmable data plane; and
      a third data structure that indicates which programmable data plane is responsible for each active RDMA session of the one or more RDMA sessions; and
   the telemetry collector uses the first, second, and third data structures to select one of the programmable data planes to provide telemetry information to the telemetry collector for an RDMA session of the one or more RDMA sessions.

* * * * *